United States Patent
Kodaira

(10) Patent No.: US 8,023,178 B2
(45) Date of Patent: Sep. 20, 2011

(54) LINE-LIKE LASER BEAM FLUX IRRADIATING APPARATUS

(75) Inventor: Junichi Kodaira, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 14 days.

(21) Appl. No.: 12/585,774

(22) Filed: Sep. 24, 2009

(65) Prior Publication Data

US 2010/0073759 A1 Mar. 25, 2010

(30) Foreign Application Priority Data

Sep. 25, 2008 (JP) ................. 2008-245058

(51) Int. Cl.
G02F 1/29 (2006.01)
G02B 26/00 (2006.01)
G02B 26/08 (2006.01)

(52) U.S. Cl. .................. 359/298; 359/237; 359/301

(58) Field of Classification Search .................. 359/298, 359/290–292, 295, 223–225, 245, 260–263, 359/198, 301–303, 317–318, 237, 242

See application file for complete search history.

(56) References Cited

U.S. PATENT DOCUMENTS 3,762,791 A * 10/1973 Fournier et al. ............ 359/201.1

FOREIGN PATENT DOCUMENTS

JP 3821712 6/2006
JP 2006-266891 10/2006

* cited by examiner

Primary Examiner — Dawayne A Pinkney
(74) Attorney, Agent, or Firm — Wenderoth, Lind & Ponack, L.L.P.

(57) ABSTRACT

A line-like (line) laser beam flux irradiating apparatus includes a laser source which emits a divergent laser beam flux, a conversion lens which converts the divergent laser beam flux to a parallel laser beam flux, a first lens which forms a first line-like laser beam flux, a second lens which forms a second line-like laser beam flux intersecting the first line-like laser beam flux, and a reflective optical system having a first reflective surface which reflects the parallel laser beam flux toward the first lens and a second reflective surface which reflects the parallel laser beam flux toward the second lens. The parallel laser beam flux is simultaneously guided to the first and second reflective surfaces so as to form a cross-wise line-like laser beam flux on the same plane by the cooperation of the first line-like laser beam flux and the second line-like laser beam flux.

6 Claims, 6 Drawing Sheets

LINE-LIKE LASER BEAM FLUX IRRADIATING APPARATUS

CROSS-REFERENCE TO THE RELATED APPLICATION

This application is based on and claims the priority benefit of Japanese Patent Application No. 2008-245058, filed on Sep. 25, 2008, the disclosure of which is incorporated herein by reference in its entirety.

BACKGROUND OF THE INVENTION

1. Field of the Invention

The present invention relates to an improvement of a line-like beam flux (line laser beam flux) irradiating apparatus capable of irradiating the line-like laser beam flux in horizontal and vertical directions.

2. Description of Related Art

JP-2006-266891-A discloses a line-like laser beam flux irradiating apparatus capable of irradiating the line-like laser beam flux in which a first cylindrical lens and a second cylindrical lens are disposed in a mutually vertical direction with each other. Laser beam flux output from a source of laser beam flux is guided to the first cylindrical lens at a first rotation-stop position so as to form a line-like laser beam flux which fans out in a vertical direction, and the thus fanned out line-like laser beam flux is guided to the second cylindrical lens at a second rotation-stop position so as to form a line-like laser beam flux which fans out in a horizontal direction.

Further, JP-3821712-B discloses a line-like laser beam flux irradiating apparatus in which a cylinder lens and a cylindrical lens are combined so as to form a spot laser beam flux (a point beam flux) in a portion of the line-like laser beam flux fanning out in a fan-shaped manner, thereby facilitating the alignment of an object in construction work.

Meanwhile, in construction work, there is a demand in which an alignment is executed by simultaneously irradiating mutually crossing cross-wise line-like laser beam flux. However, in the prior art line-like laser beam flux irradiating apparatus, since only any one of two line-like laser beam flux can be formed, there arises a problem in that it is inconvenient in actual use.

SUMMARY OF THE INVENTION

Thus, in order to make an arrangement in which mutually crossing cross-wise line-like laser beam flux can be simultaneously irradiated, it is considered that two emitting laser beam flux sources are arranged so as to mutually and independently irradiate the line-like laser beam flux. However, with such an arrangement, an optical system must be independently arranged for every emitting laser beam flux source. Thus, there arise problems in that it is inefficient and also expensive.

The present invention is made taking account of the above-mentioned problems. Thus, it is an object of the invention to provide a line-like laser beam flux irradiating apparatus in which mutually crossing cross-wise line-like laser beam flux is formed by a single laser beam flux source and enables a cross-wise crossing intersection point to be used for the positional alignment, thereby facilitating the alignment with the object of construction work and enhancing convenience.

According to one embodiment of the present invention, a line-like laser beam flux irradiating apparatus comprises: a laser beam flux source which emits a divergent laser beam flux; a conversion lens which converts the divergent laser beam flux to a parallel laser beam flux; a first lens which forms a first line-like laser beam flux; a second lens which forms a second line-like laser beam flux intersecting the first line-like laser beam flux; and a reflective optical system comprised of a first reflective surface which reflects the parallel laser beam flux toward the first lens and a second reflective surface which reflects the parallel laser beam flux toward the second lens. A laser beam flux switching device is disposed between the reflective optical system and the conversion lens and guides the parallel laser beam flux to the first reflective surface and the second reflective surface so as to switch a course of the parallel laser beam flux between a first laser beam flux state under which a cross-wise line-like laser beam flux is formed by the cooperation of the first line-like laser beam flux and the second line-like laser beam flux, a second laser beam flux state under which the parallel laser beam flux is guided to the first reflective surface so as to form only the first line-like laser beam flux, and a third laser beam flux state under which the parallel laser beam flux is guided to the second reflective surface so as to form only the second line-like laser beam flux. The first reflective surface reflects the parallel laser beam flux which transmits the second reflective surface.

According to another embodiment of the present invention, the divergent laser beam flux comprises a linearly polarized laser beam flux. The laser beam flux is provided with a ¼λ retardation plate which converts the linearly polarized laser beam flux of the parallel laser beam flux converted by means of the conversion lens into a circularly polarized laser beam flux, a ½λ retardation plate which linearly converts the linearly polarized laser beam flux in a polarized direction perpendicular to a polarized direction of the linearly polarized laser beam flux, and a transmission window which transmits the linearly polarized laser beam flux while maintaining the polarized direction of the linearly polarized laser beam flux. The second reflective surface has a polarization property which completely reflects the linearly polarized laser beam flux transmitted while maintaining the polarization direction of the linearly polarized laser beam flux toward the second lens, and the first reflective surface has a polarization property which completely reflects the laser beam flux linearly polarized in a polarization direction perpendicular to a polarization direction of the laser beam flux by means of the ½λ retardation plate toward the first lens.

According to another embodiment of the present invention, the reflective optical system is comprised of a rhombus prism According to another embodiment of the present invention, the laser beam flux source, the conversion lens, the reflective optical system, and the optical flux switching device are disposed in a housing, and the housing is adapted to be rotatable around an intersection point of the cross-wise line-like laser beam flux.

According to another embodiment of the present invention, the housing is rotatable in a vertical plane, is provided.

According to another embodiment of the present invention, the housing is provided with a sensor for aligning, and a line-like laser beam flux parallel to a horizontal surface is formed based upon the aligning sensor.

According to another embodiment according to the present invention, a line-like laser beam flux irradiating apparatus comprises: a laser beam source which emits a divergent laser beam flux; a conversion lens which converts the divergent laser beam flux to a parallel laser beam flux; a first lens which forms a first line-like laser beam flux; a second lens which forms a second line-like laser beam flux intersecting the first line-like laser beam flux; and a reflective optical system comprised of a first reflective surface which reflects the parallel laser beam flux toward the first lens and a second reflective surface which reflects the parallel laser beam flux toward the second lens. A laser beam flux switching device is disposed between the reflective optical system and the conversion lens and guides the parallel laser beam flux to the first reflective surface and the second reflective surface so as to switch a course of the parallel laser beam flux between a first laser beam flux state under which a cross-wise line-like laser beam flux is formed by the cooperation of the first line-like laser beam flux and the second line-like laser beam flux, a second laser beam flux state under which the parallel laser beam flux is guided to the first reflective surface so as to form only the first line-like laser beam flux, and a third laser beam flux state under which the parallel laser beam flux is guided to the second reflective surface so as to form only the second line-like laser beam flux. The parallel laser beam flux is simultaneously guided to the first reflective surface and the second reflective surface so as to form a cross-wise line-like laser beam flux by the cooperation of the first line-like laser beam flux and the second line-like laser beam flux.

DETAILED DESCRIPTION OF THE PREFERRED EMBODIMENTS

Preferred Embodiments of a line-like (line) laser beam flux irradiating apparatus according to the present invention will be described below with reference to the accompanying drawings.

Figure 1:
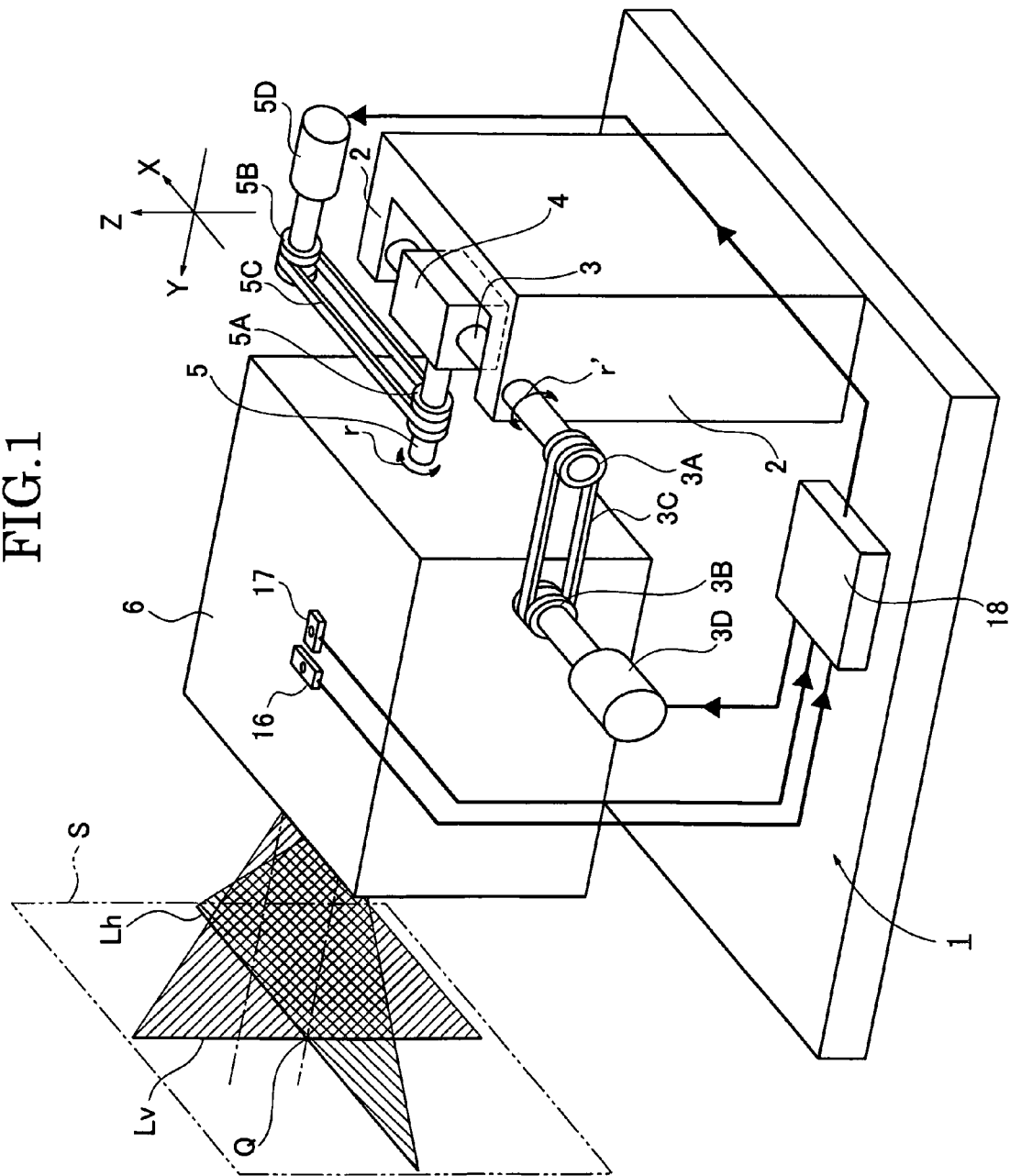
FIG. 1 is a schematic perspective view of a line-like laser beam flux irradiating apparatus according to the present invention.
Figure 2:
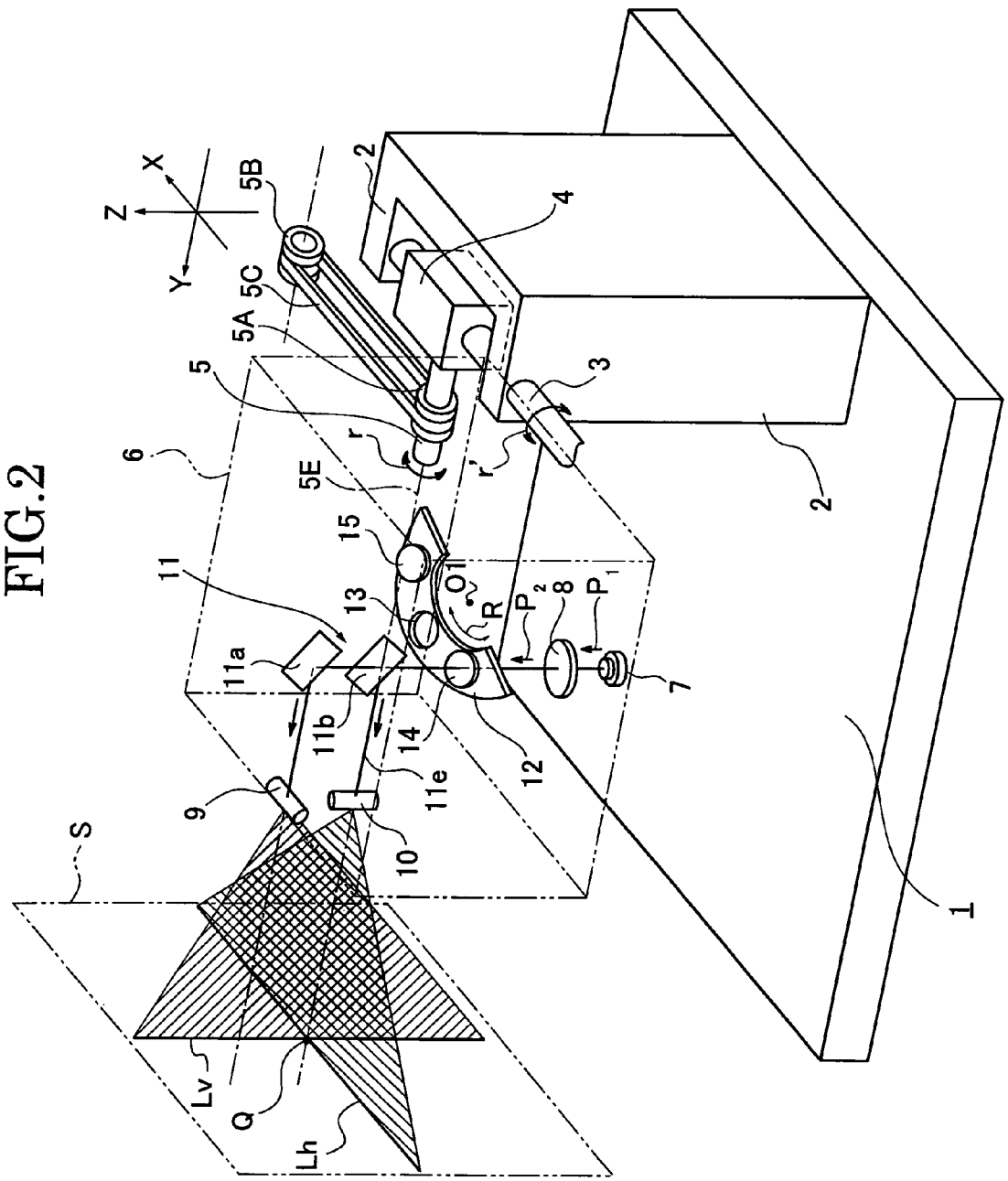
FIG. 2 is a perspective view illustrating an arrangement state in which optical elements are provided inside the housing shown in FIG. 1, illustrating a state of the laser beam flux comprising a cross-wise line-like laser beam flux.

FIGS. 1 and 2 are views for illustrating the line-like laser beam flux irradiating apparatus according to the present invention. In these FIGS. 1 and 2, the reference numeral 1 designates a reference fixed plate, and the reference numerals 2,2 designate a pair of mounting plate parts. The pair of mounting plate parts 2,2 are provided perpendicular to the reference fixed plate.

The pair of mounting plate parts 2,2 are disposed in an opposed manner with each other (i.e., to oppose each other). A supporting shaft 3 is extended across the pair of mounting plate parts 2,2 in a rotatable manner. A supporting block 4 is fixed on the supporting shaft 3. Provided on the supporting shaft 3 is a driven pulley 3A as shown in FIG. 1. Provided on an output shaft of a drive motor described later is a drive pulley 3B which is disposed in an opposed manner to (opposes) the driven pulley 3A.

A drive belt 3C is stretched between the drive pulley 3A and the driven pulley 3B. The driven pulley 3B is rotated by driving a drive motor (pulse motor) 3D. The drive motor 3D is mounted on and fixed to the reference fixed plate 1.

A supporting shaft 5 is provided on the support block 4 in a rotatable manner. Provided on the supporting shaft 5 is a driven pulley 5A. Provided on an output shaft of a drive motor described later is a drive pulley 5B which is disposed in an opposed manner to the driven pulley 5A. A drive belt 5C is stretched between the driven pulley 5A and the drive pulley 5B. The drive pulley 5B is rotated by driving a drive motor (pulse motor) 5D. The drive motor 5D is mounted on and fixed to the reference fixed plate 1.

A housing 6 having a cubic shape is mounted on one end of the supporting shaft 5. Inside the housing 6 are disposed a laser beam flux source 7, a conversion lens 8, a first lens 9, a second lens 10, a reflective optical system 11, and a laser flux switching device 12 (see FIG. 2).

Herein, the laser beam flux source 7 comprises a laser diode which generates a linearly polarized divergent laser beam flux $P_1$. The conversion lens 8 comprises a collimate lens which converts the linearly polarized divergent laser flux $P_1$ into a parallel laser beam flux $P_2$.

The first lens 9 is comprised of a rod lens which extends in one direction perpendicular to the other direction to which a first line-like laser beam flux Lv extends in order to form the first line-like laser beam flux Lv. The second lens 10 is comprised of a rod lens which extends in one direction perpendicular to the other direction to which a second line-like laser beam flux Lh extends in order to form the second line-like laser beam flux Lh crossing (perpendicular to) the first line-like laser beam flux Lv.

A reflective optical system 11 is herein comprised of one reflective member having a first reflective surface 11a which reflects a parallel laser beam flux $P_2$ toward the first lens 9, and the other reflective member having a second reflective surface 11b which reflects the parallel laser beam flux $P_2$ toward the second lens 10.

The laser beam flux switching device 12 is provided between the reflective optical system 11 and the conversion lens 8. The laser beam flux switching device 12 comprises a fan-shaped plate. The fan-shaped plate is allowed to reciprocate in a direction along an arrow r around a center of an arc of a circle $O_1$.

The fan-shaped plate is formed with three openings which are spaced in a direction along the arc. A center opening among the three openings is a transmission window 13 through which the parallel laser beam flux $P_2$ comprising a linearly polarized laser beam flux is transmitted while the linearly polarization property remains maintained.

One opening of the fan-shaped plate in which the transmission window 13 is disposed between both end openings is provided with a ¼λ retardation plate 14 which converts the parallel laser beam flux $P_2$ comprising the linearly polarized laser beam flux into a circularly polarized laser beam flux. The other opening of the sector in which the transmission window 13 is disposed between both end openings is provided with a ½λ retardation plate 15 which linearly polarizes the parallel laser beam flux $P_2$ comprising the linearly polarized laser beam flux in one polarization direction which is perpendicular to the other polarization direction of the linearly polarized laser beam flux.

The second reflective surface 11b is made of a material having a polarization property which completely reflects a S-polarized laser beam flux and completely transmits a P-polarized laser beam flux. Further, the first reflective surface 11a is made of a material having a polarization property which completely reflects a P-polarized laser beam flux.

Figure 3:
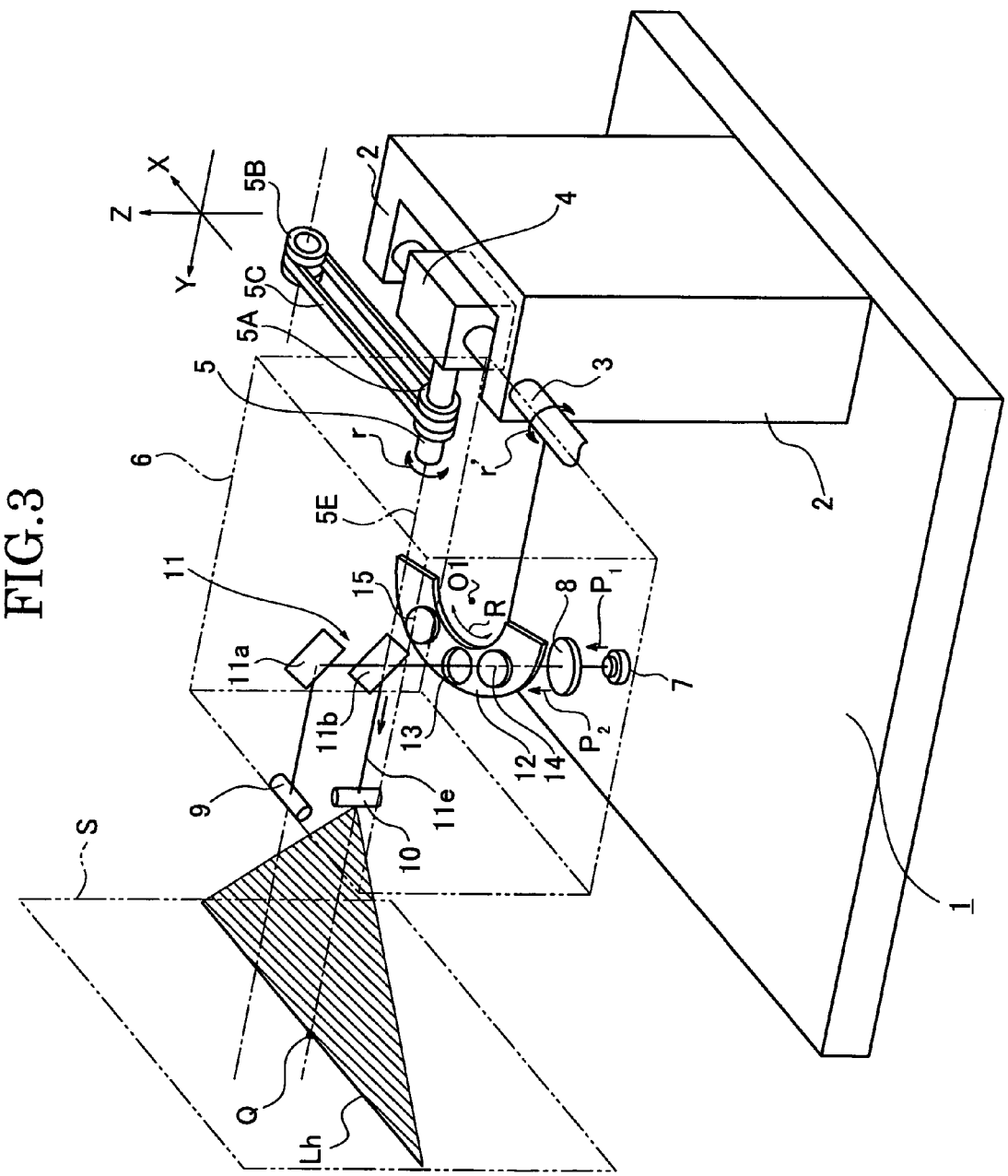
FIG. 3 is a perspective view illustrating an arrangement state in which optical elements are provided inside the housing shown in FIG. 1, illustrating a state of the laser beam flux comprising a second line-like laser beam flux.

The polarization direction of the linearly polarized laser beam flux included in the divergent laser beam flux $P_1$ exit from a laser diode 7 is aligned with the polarization direction of the S-polarized laser beam flux and is guided through the transmission window 13 to the second reflective surface 11b. The second reflective surface 11b has a polarization property which completely reflects the S-polarized laser beam flux. The linearly polarized laser beam flux which is converted into the parallel laser beam flux $P_2$ while the polarization direction remains retained, by the conversion lens 8, is completely reflected by the second reflective surface 11b and is guided to the second lens 10, as shown in FIG. 3, so as to form a fan-shaped line-like laser beam Lh.

When the fan-shaped plate is rotated around the center of the arc of circle $O_1$ and thus the ½λ retardation plate 15 is positioned between the reflective optical system 11 and the conversion lens 8, the parallel laser beam flux $P_2$ included in the S-polarized laser beam flux is converted into the P-polarized laser beam flux. The thus parallel laser beam flux $P_2$ of the linearly polarized laser beam flux converted into the P-polarized laser beam flux is guided to the second reflective surface 11b.

The P-polarized parallel laser beam flux $P_2$ is transmitted through the second reflective surface 11b and is guided to the first reflective surface 11a since the second reflective surface 11b has a polarized property which completely transmits the P-polarized laser beam flux.

The P-polarized parallel laser beam flux P2 guided to the first reflective surface 11a is completely reflected by the first reflective surface 11a and is guided to the first lens 9 so as to form a fan-shaped line-like laser beam flux Lv.

When the fan-shaped plate is rotated around the center of the arc of circle $O_1$ and thus the ¼λ retardation plate 14 is positioned between the reflective optical system 11 and the conversion lens 8 as shown in FIG. 2, the S-polarized parallel laser beam flux $P_2$ is converted into the circularly polarized laser beam by the ¼λ retardation plate 14. The flux converted into the circularly polarized parallel laser beam flux $P_2$ is guided to the second reflective surface 11b.

The circularly polarized parallel laser beam flux $P_2$ is approximately half reflected by the second reflective surface 11b and is guided to the second lens 10. The remaining approximate half of the circularly polarized parallel laser beam flux $P_2$ is guided to the first reflective surface 11a and is completely reflected by the first reflective surface 11a and then is guided to the first lens 9.

The line-like laser beam flux Lv is formed by the first lens 9 and the line-like laser beam flux Lh is formed by the second lens 10, thereby forming a cross-wise line-like laser beam flux, as shown in FIG. 2.

Figure 4:
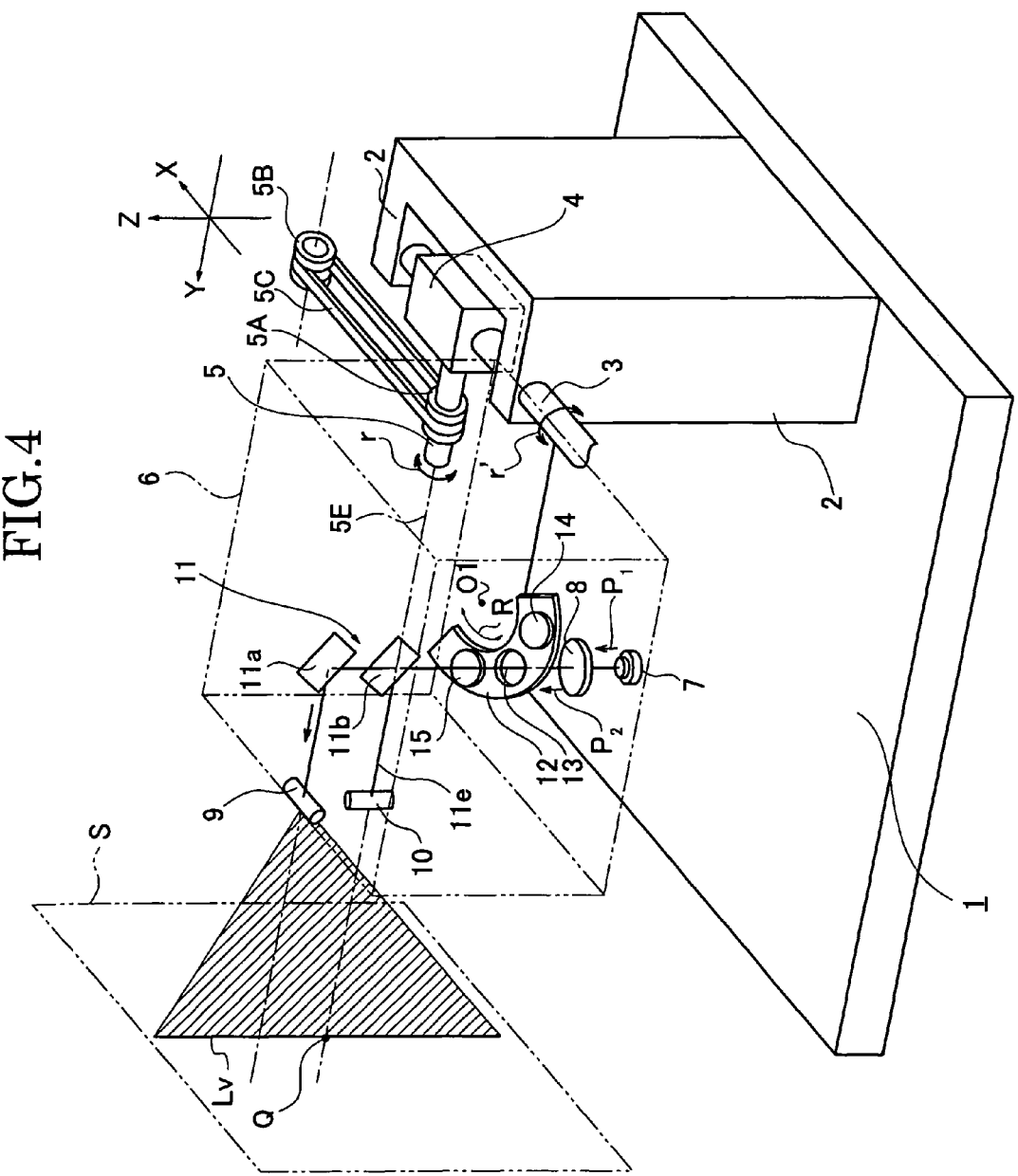
FIG. 4 is a perspective view illustrating an arrangement state in which optical elements are provided inside the housing shown in FIG. 1, illustrating a state of the laser beam flux comprising a first line-like laser beam flux.

Accordingly, the laser beam flux switching device 12 serves to play a role in switching a course of the parallel laser beam flux $P_2$ between a first laser beam flux state under which the parallel laser beam flux $P_2$ is guided to both the first reflective surface 11a and the second reflective surface 11b and then the first line-like laser beam flux Lv and the second line-like laser beam flux Lh are simultaneously formed so as to form the cross-wise line-like laser beam flux as shown in FIG. 2 on the X-Z plane (in the same plane S as FIG. 2), the second laser beam state as shown in FIG. 4 under which the parallel laser beam flux $P_2$ is guided to the first reflective surface 11a so as to form only the first line-like laser beam flux Lv, and a third laser beam flux state as shown in FIG. 3 under which the parallel laser beam flux $P_2$ is guided to the second reflective surface 11b so as to form only the second line-like laser beam flux Lh.

In this embodiment, the housing 6 is arranged to be fixed to the supporting shaft 5 so that an extension line 5E in a direction along which the supporting shaft 5 extends is aligned with a reflective optical axis 11e and the extension line 5E of the supporting shaft 5 is aligned with an intersection point Q of the cross-wise line-like laser beam flux.

The housing 6 is rotatable within the X-Z plane (plane 5) as shown in FIG. 2 in a direction indicated by the arrow "r" around the intersection point Q of the cross-wise line-like laser beam flux, and is rotatable within the Y-Z plane (vertical plane) as shown in FIG. 2 in a direction indicated by the arrow "r'".

Provided on an upper surface of the housing 6 are tilt sensors 16, 17 each extending in the X and Y directions crossing at right angles (see FIG. 1). The outputs of the tilt sensors (sensors for aligning) 16, 17 are input to a control circuit 18. The control circuit 18, based upon the outputs of the tilt sensors (aligning sensors) 16, 17, outputs control signals to each of drive motors 3D, 5D, respectively. Based upon these control signals, a rotating angle of the supporting shafts 3, 5 is adjusted. As a result, the second line-like laser beam flux Lh is set parallel to a horizontal plane based upon the outputs of these tilt sensors 16, 17. The thus set horizontal plane is made as a reference plane.

Next, the method for using the line-like laser beam flux irradiating apparatus will be described below with reference to the drawings of FIGS. 2 and 5.

First of all, the ¼λ retardation plate 14 is inserted into an optical path of the parallel laser beam flux $P_2$. The linearly polarized parallel laser beam flux $P_2$ is converted into the circularly polarized parallel laser beam flux $P_2$ by the ¼λ retardation plate 14. The circularly polarized parallel laser beam flux $P_2$ is guided up to the first reflective surface 11a as shown in FIG. 2 and is reflected by the first reflective surface 11a, thereby guiding approximately half amount of the parallel laser beam flux $P_2$ to the first lens 9. The remaining approximately half amount of the parallel laser beam flux $P_2$ is guided to the second reflective surface 11b and is completely reflected by the second reflective surface 11b and then the approximately half-amount of the parallel laser beam flux $P_2$ is guided to the second lens 10.

The first lens 9 forms the first line laser beam flux Lv based upon the parallel laser beam flux $P_2$ reflected by the first reflective surface 11a. The second lens 10 forms the second line laser beam flux Lh based upon the parallel laser beam flux $P_2$ reflected by the second reflective surface 11b.

The first line laser beam flux Lv and the second line laser beam flux Lh are projected onto a wall surface 19a of a wall section 19 as an object of construction work. Then, the cross-wise line-like laser beam flux comprised of the first line-like laser beam flux Lv and the second line-like laser beam flux Lh is formed on the wall surface 19a.

Figure 5:
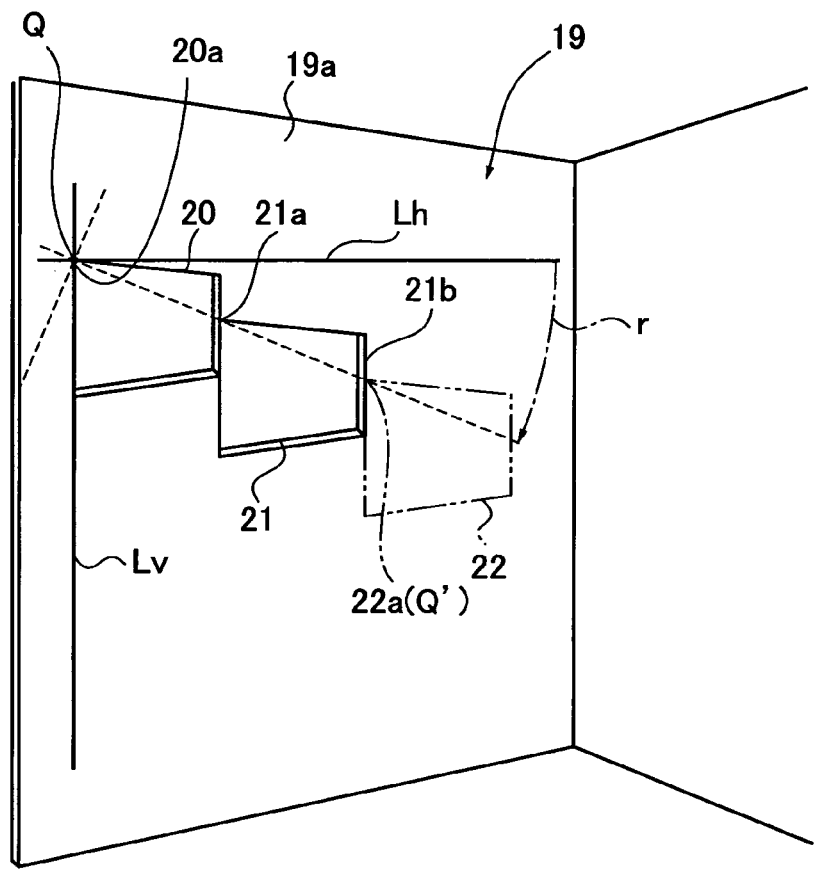
FIG. 5 is a view illustrating one example of a method for using the line-like laser beam flux irradiating apparatus according to the present invention.

For example, if a plurality of windows 20, 21, and 22 are continuously formed on the wall section 19 at a predetermined difference level with respect to each other, the intersection point Q of the first line-like laser beam flux Lv and the second line-like laser beam flux Lh is aligned with a corner section 20a of the already formed window 20, as shown in FIG. 5, and the cross-wise line-like laser beam is rotated around the intersection point Q in a direction indicated by an arrow "r" so that the second line-like laser beam flux Lh is aligned with a side section 21a of the already formed window 21 by controlling a control circuit 18, for example, with a remote control by using a control apparatus (not shown).

Thereby, a position of a corner section 22a of the next window 22 to be formed is given as an intersection point Q' of a side section 21b of the already formed window 21 and the second line-like laser beam flux Lh. Thus, a position of the corner section 22a of the next window 22 to be formed can be promptly determined by means of a simple operation.

By aligning the cross-wise intersection point Q projected on the wall section 19 with the corner section 20, since the apparatus is adapted to be remote-controlled by using this kind of remote control apparatus, the operator standing in a side nearer to the wall section 19 can execute construction work while recognizing the intersection point Q, and this is preferable.

Further, since the apparatus is adapted to be formed so that only the line-like laser beam flux in one direction is formed on the wall section 19 by the laser beam switching device, the brightness of the line-like laser beam flux in such a case can be increased in comparison with the brightness in a case where the line-like laser beam flux in two directions is formed.

Figure 6:
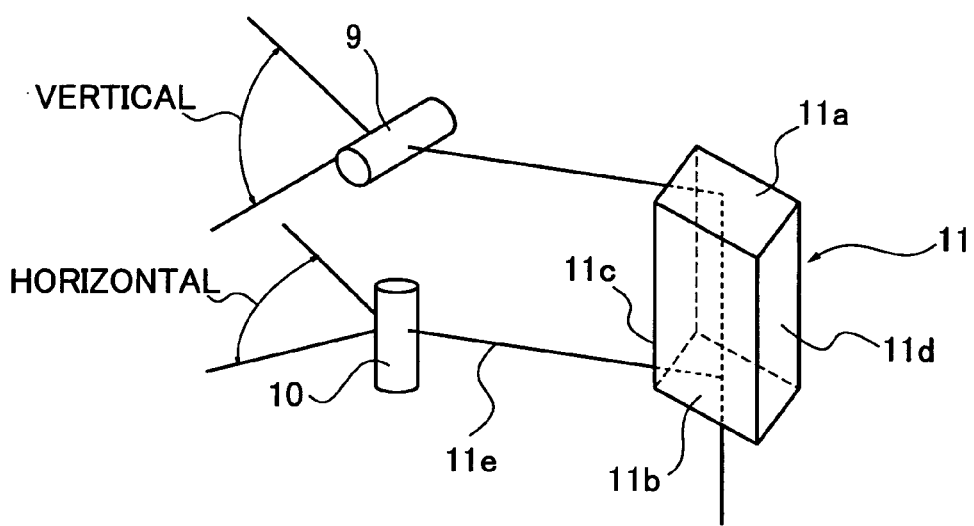
FIG. 6 is an optical diagram illustrating another example of a reflective system shown in FIG. 2.
Figure 7:
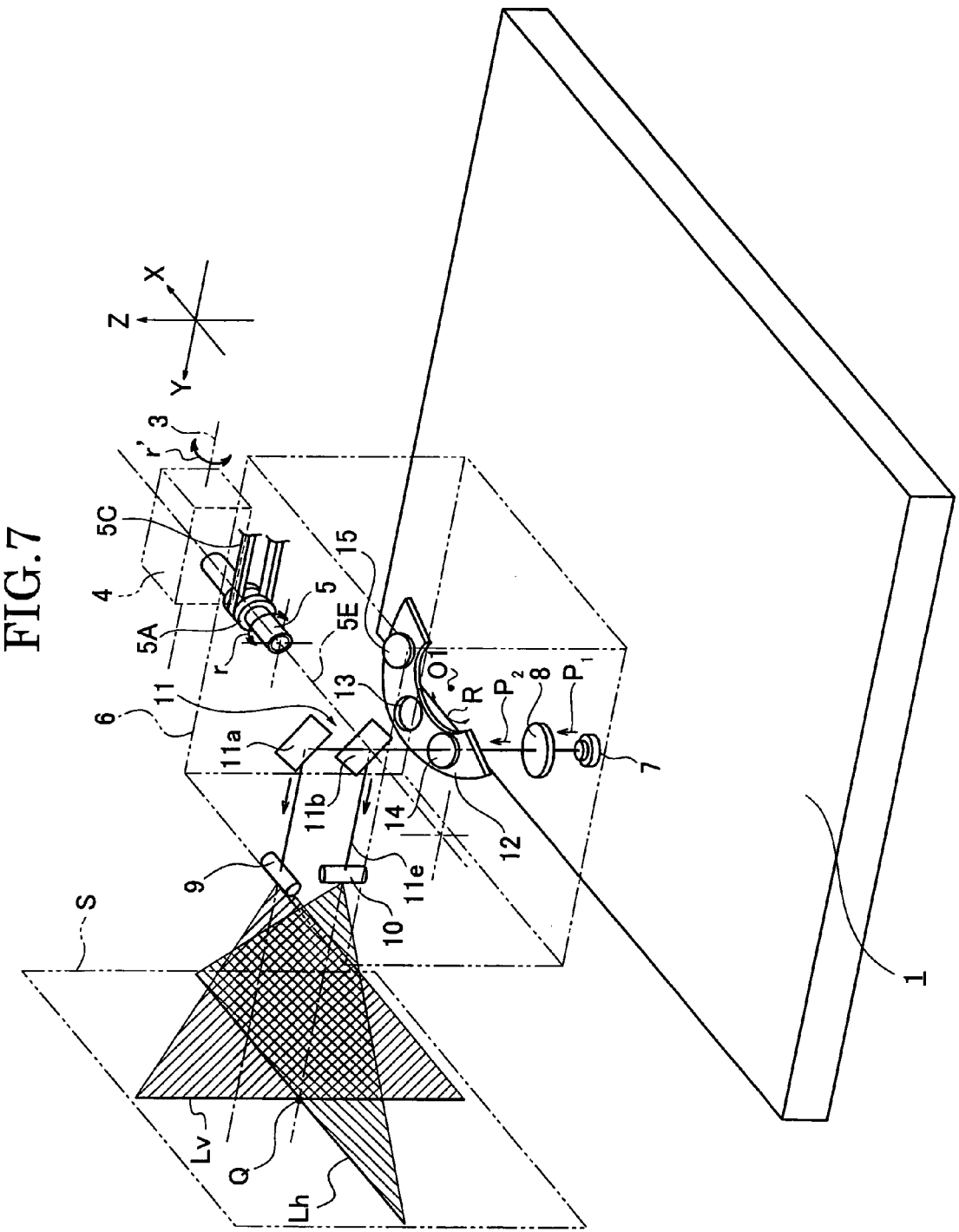
FIG. 7 is a perspective view illustrating another example of the line-like laser beam flux irradiating apparatus according to the present invention.

FIG. 6 shows another example of the reflective optical system 11, which is comprised of a rhombus prism. The rhombus prism comprises a reflective surface 11a, a reflective surface 11b, and two parallel transmission surfaces 11c, 11d.

As shown in FIG. 2, in a case where reflective members of the reflective optical system 11 are adapted to be independently provided (separate) in the housing 6, if the environmental temperature and the like are changed, a relative angle between two reflective members changes due to the expansion and contraction and the like of the housing 6. As a result, differences occur in reflective angles of the two reflective members and thus differences occur in angles between the first line-like laser beam flux Lv and the second line-like laser beam flux Lh which should be crossed at right angles.

On the contrary, the rhombus prism can be used as a reflective member of the reflective optical system 11. Since the relative positional relationship between the reflective surface 11a and the reflective surface 11b does not change even if the environmental temperature and the like are changed, the occurrence of a difference in the relative angle between two reflective surfaces 11a, 11b can be prevented. Accordingly, the occurrence of a difference in angle of the arrangement between the two reflective surfaces depending on the environmental temperature and the like can be avoided. Further, since the relationship between an angle of incidence and an output angle is maintained to a certain degree irrespectively, the first line-like laser beam flux Lv and the second line-like beam flux Lh are maintained as being crossed at right angles.

As mentioned-above, in an embodiment according to the present invention, the following three laser beam flux states are adapted to be formed: a first laser beam flux state under which the parallel laser beam flux $P_2$ is guided to the first reflective surface 11a and the second reflective surface 11b so as to simultaneously form the first line-like laser beam flux Lv and the second line-like laser beam flux Lh and one laser beam flux state is formed by their cooperation within the same plane, a second laser beam flux state under which the parallel laser beam flux $P_2$ is guided to the first reflective surface 11a so as to form only the first line-like laser beam flux Lv, and a third laser beam flux state under which the parallel laser beam flux $P_2$ is guided to the second reflective surface 11b so as to form only the second line-like laser beam flux Lh. However, only one laser beam flux state may be formed as follows: a laser beam flux state under which the parallel laser beam flux $P_2$ is guided to the first reflective surface 11a and the second reflective surface 11b so as to simultaneously form the first line-like laser beam flux Lv and the second line-like laser beam flux Lh and only one laser beam flux state is formed by their cooperation.

Further, in an embodiment according to the present invention, although the housing 6 is adapted to be fixed to the supporting shaft 5 so that an extension line 5E in a direction along which the supporting shaft 5 extends is aligned with a reflective optical axis 11e of the reflective surface 11b, the housing 6 may be adapted to be fixed to the supporting shaft 5 so that the extension line 5E of the supporting shaft 5 is crossed at right angles with the reflective optical axis 11e of the reflective surface 11b.

EFFECT OF THE INVENTION

According to one embodiment according to the present invention, since a single laser beam flux source realizes the following three states: a first laser beam flux state comprises only the first line-like laser beam flux state, a second laser beam flux state comprises only the second line-like laser beam flux state which is crossed at right angles to the first line-like laser beam flux state, and a third laser beam flux state comprises a cross-wise laser beam flux state which is formed by the cooperation of the first line-like laser beam flux and the second line-like laser beam flux, it is possible to facilitate the positional alignment and enhance the convenience.

According to another embodiment according to the present invention, since the rhombus prism is used as a reflective member of the reflective optical system, it is possible to avoid the occurrence of a difference of the angle of arrangement depending upon the environmental temperature and the like. Further, since the relationship between an angle of incidence and an output angle is maintained to a certain degree irrespective of their postures, a crossing angle between the first line-like laser beam flux and the second line-like beam flux can be maintained.

According to another embodiment according to the present invention, since it is possible to align a position based upon the intersection point of the cross-wise line-like laser beam flux and rotate the cross-wise line-like laser beam flux around the intersection point, it is possible to promptly execute the alignment operation of an object of construction work.

According to another embodiment according to the present invention, it is possible to facilitate the formation of the horizontal line of the first line-like laser beam flux.

According to another embodiment according to the present invention, it is possible to form the cross-wise line-like laser beam crossing with each other by means of a single laser beam flux source and it is also possible to use the cross-wise intersection point for alignment operation, thereby facilitating the alignment operation and enhancing the convenience.

Although the preferred embodiments of the present invention have been described, it should be noted that the present invention is not limited to those embodiments, and various modifications and changes can be made to the embodiments.

What is claimed is:
1. A line laser beam flux irradiating apparatus comprising:
a laser beam flux source which emits a divergent laser beam flux;
a conversion lens which converts the divergent laser beam flux to a parallel laser beam flux;
a first lens which forms a first line laser beam flux;
a second lens which forms a second line laser beam flux intersecting the first line laser beam flux;
a reflective optical system comprised of a first reflective surface which reflects the parallel laser beam flux toward the first lens and a second reflective surface which reflects the parallel laser beam flux toward the second lens; and a laser beam flux switching device which is disposed between the reflective optical system and the conversion lens and guides the parallel laser beam flux to the first reflective surface and the second reflective surface so as to switch a course of the parallel laser beam flux between a first laser beam flux state in which a cross-wise line laser beam flux is formed by the cooperation of the first line laser beam flux and the second line laser beam flux, a second laser beam flux state in which the parallel laser beam flux is guided to the first reflective surface so as to form only the first line laser beam flux, and a third laser beam flux state in which the parallel laser beam flux is guided to the second reflective surface so as to form only the second line laser beam flux, wherein the first reflective surface reflects the parallel laser beam flux which transmits the second reflective surface;

wherein the divergent laser beam flux comprises a linearly polarized laser beam flux, and the laser beam flux switching device has a ¼λ retardation plate which converts the linearly polarized laser beam flux of the parallel laser beam flux converted by means of the conversion lens into a circularly polarized laser beam flux, a ½λ retardation plate which linearly converts the linearly polarized laser beam flux in a polarized direction perpendicular to a polarized direction of the linearly polarized laser beam flux, and a transmission window which transmits the linearly polarized laser beam flux while maintaining the polarized direction of the linearly polarized laser beam flux, wherein the second reflective surface has a polarization property which totally reflects the linearly polarized laser beam flux transmitted while maintaining the polarization direction of the linearly polarized laser beam flux toward the second lens, and wherein the first reflective surface has a polarization property which totally reflects the laser beam flux linearly polarized in a polarization direction perpendicular to a polarization direction of the laser beam flux by means of the ½λ retardation plate toward the first lens.

2. The line like line laser beam flux irradiating apparatus as claimed in claim 1,
wherein the reflective optical system comprises a rhombus prism.

3. The line laser beam flux irradiating apparatus as claimed in claim 2,
further comprising a housing,
wherein the laser beam flux source, the conversion lens, the reflective optical system, and the optical flux switching device are disposed in the housing, and
wherein the housing is adapted to be rotatable around an intersection point of the cross-wise line laser beam flux.

4. The line laser beam flux irradiating apparatus as claimed in claim 3,
wherein the housing is rotatable in a vertical plane.

5. The line laser beam flux irradiating apparatus as claimed in claim 4,
wherein the housing has a sensor for aligning, and
wherein a line laser beam flux parallel to a horizontal surface is formed based upon the aligning sensor.

6. A line laser beam flux irradiating apparatus comprising:
a laser beam flux source which emits a divergent laser beam flux;
a conversion lens which converts the divergent laser beam flux to a parallel laser beam flux;
a first lens which forms a first line laser beam flux;
a second lens which forms a second line laser beam flux intersecting the first line laser beam flux;
a reflective optical system comprised of a first reflective surface which reflects the parallel laser beam flux toward the first lens and a second reflective surface which reflects the parallel laser beam flux toward the second lens; and
a laser beam flux switching device which is disposed between the reflective optical system and the conversion lens and guides the parallel laser beam flux to the first reflective surface and the second reflective surface so as to switch a course of the parallel laser beam flux between a first laser beam flux state in which a cross-wise line laser beam flux is formed by the cooperation of the first line laser beam flux and the second line laser beam flux, a second laser beam flux state in which the parallel laser beam flux is guided to the first reflective surface so as to form only the first line laser beam flux, and a third laser beam flux state in which the parallel laser beam flux is guided to the second reflective surface so as to form only the second line laser beam flux, wherein the parallel laser beam flux is simultaneously guided to the first reflective surface and the second reflective surface so as to form a cross-wise line laser beam flux by the cooperation of the first line laser beam flux and the second line laser beam flux, wherein the divergent laser beam flux comprises a linearly polarized laser beam flux, and the laser beam flux switching device has a ¼λ retardation plate which converts the linearly polarized laser beam flux of the parallel laser beam flux converted by means of the conversion lens into a circularly polarized laser beam flux, a ½λ retardation plate which linearly converts the linearly polarized laser beam flux in a polarized direction perpendicular to a polarized direction of the linearly polarized laser beam flux, and a transmission window which transmits the linearly polarized laser beam flux while maintaining the polarized direction of the linearly polarized laser beam flux, wherein the second reflective surface has a polarization property which totally reflects the linearly polarized laser beam flux transmitted while maintaining the polarization direction of the linearly polarized laser beam flux toward the second lens, and wherein the first reflective surface has a polarization property which totally reflects the laser beam flux linearly polarized in a polarization direction perpendicular to a polarization direction of the laser beam flux by means of the ½λ retardation plate toward the first lens.

* * * * *